United States Patent [19]

Herrington

[11] Patent Number: 4,708,617

[45] Date of Patent: Nov. 24, 1987

[54] SCREW EXTRUDER WITH A ROTATABLE BARREL SECTION

[75] Inventor: Fox J. Herrington, Holcomb, N.Y.

[73] Assignee: Mobil Oil Corporation, New York, N.Y.

[21] Appl. No.: 871,332

[22] Filed: Jun. 6, 1986

[51] Int. Cl.⁴ .................................................. B29C 47/00
[52] U.S. Cl. .................................. 425/135; 264/40.1; 366/94; 425/185; 425/205; 425/208; 425/DIG. 21
[58] Field of Search ............... 425/205, 208, 207, 209, 425/DIG. 21, 376 B, 381.2, 145, 135, 185; 366/92, 94, 95, 78; 264/349, 40.1

[56] References Cited

U.S. PATENT DOCUMENTS

| | | | |
|---|---|---|---|
| 3,748,074 | 7/1973 | Nitta et al. | 425/381.2 |
| 4,197,070 | 4/1980 | Koschmann | 425/135 |
| 4,214,859 | 7/1980 | Anders | 425/147 |
| 4,289,410 | 9/1981 | Anders | 366/88 |
| 4,300,840 | 11/1981 | Kishihiro | 366/88 |
| 4,365,946 | 12/1982 | Anders | 425/376 B |

Primary Examiner—Jay H. Woo
Assistant Examiner—Karl D. Sturge
Attorney, Agent, or Firm—Alexander J. McKillop; Michael G. Gilman; Charles J. Speciale

[57] ABSTRACT

A screw extruder comprises a barrel including a section that is supported for rotation about the longitudinal axis of the barrel. A screw extends and is supported for rotation in the barrel; and, in use, rotation of the screw rotates and advances plastic material through the barrel. Rotation of the screw also causes the rotatable barrel section to rotate, and a brake is connected to that rotatable section to maintain the rotational speed of the rotatable section less than the rotational speed of the extruder screw. The rotational speed of the screw relative to the rotatable barrel section controls the relative rates at which plastic is mixed, heated, and pressurized in the barrel.

17 Claims, 1 Drawing Figure

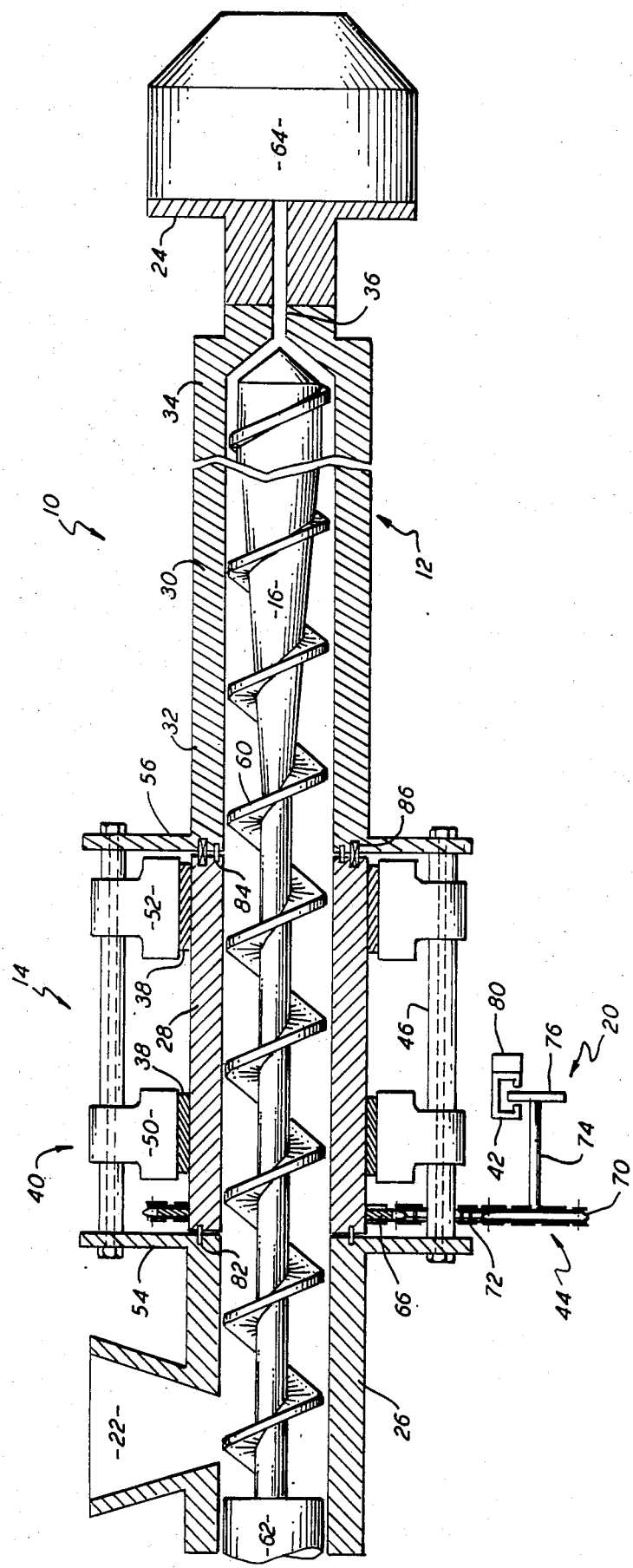

SCREW EXTRUDER WITH A ROTATABLE BARREL SECTION

BACKGROUND OF THE INVENTION

1. Field of the Invention

This invention generally relates to plastic screw extruders; and more specifically, to a screw extruder designed to adjust easily the relative rates at which a plastic material is pressurized, heated and mixed as that material passes through the extruder, and to a method of operating such an extruder.

2. Description of the Prior Art

Typically, a plastic screw extruder comprises an elongated cylinder or barrel, a feed hopper mounted on one end of the barrel, a rotatable screw axially extending in the barrel, and a plurality of heaters provided around the outside walls of the barrel. In use, a plastic material, such as a polymer in the form of solid pellets or chips, is fed into the hopper, which in turn feeds that material into the extruder barrel. The screw in the barrel is rotated to advance the plastic therethrough, and the heaters around the barrel are activated to heat the plastic as it advances therein. This heat and the frictional heat from the rotating screw cause the plastic to change from the solid state to a molten state, and the molten material is then forced from the barrel and through a die that forms the molten plastic into a desired shape. This formed material can be subjected to subsequent shaping operations and, for example, a plastic that is extruded in the shape of a tube can later be expanded in a blow molding operation to form a plastic bottle.

In this extrusion operation, the extruder screw mixes, pressurizes, and heats the plastic material advancing through the extruder. All of these parameters affect the output of the extruder, and it is thus desirable to obtain certain pressure, temperature and mixing levels in order to obtain a certain output from the extruder. The degrees to which the extruder screw mixes, pressurizes and heats the plastic material are all interdependent, however, so that changing the level of one of these parameters normally affects the levels of the other parameters. As a result, in practice, any particular chosen combination of such parameters is usually a compromise between optimum levels of pressure, temperature and mixing.

In a given extrusion process, a given extruder screw will normally produce a particular combination of pressure, temperature and mixing; but it is often very difficult, if not practically impossible, to predict in advance what that particular combination will be. Thus, selecting the proper screw for a particular extrusion process is normally the result of trial and error; that is, trying a number of different screw designs to see which one produces, or comes closest to producing, the desired combination of pressure, temperature and mixing. Each time a different screw is tried, though, the extruder must be taken apart, the screw replaced with one of a different design, and then the extruder reassembled. As will be understood by those skilled in the art, this is a time consuming and expensive procedure.

Moreover, often a particular extruder barrel will be used in a number of different extrusion processes. Usually, each time an extruder barrel is employed in a different process, the extruder screw must be replaced with another screw in order to obtain the preferred mixing, pressure and temperature levels for the new process. Even when it is known what screw will produce that new combination of conditions, replacing the extruder screw with one having a different design is a laborious and costly procedure.

Various prior art plastic screw extrusion methods and apparatus are disclosed in U.S. Pat. Nos. 4,197,070; 4,214,859; 4,289,410; and 4,300,840.

U.S. Pat. No. 4,197,070 discloses a control system for a plastic extruder which automatically controls both the melt pressure and the melt temperature of the plastic material at the outlet of the extruder barrel.

U.S. Pat. No. 4,214,859 describes an arrangement for adjusting the output quantity of a screw extruder by varying the cross-sectional area of the extruder cylinder available for plastic flow. This is done to match the output quantity of the extruder to the output quantity of a polymerization system that feeds the extruder.

U.S. Pat. No. 4,289,410 discloses a plastic screw extruder comprising a cylinder and a screw, each of which includes a plurality of vertically divided segments. Individual screw segments can be replaced by removing the adjacent cylinder segment, and it is not necessary to completely disassemble the cylinder or to completely remove the screw therefrom.

U.S. Pat. No. 4,300,840 discloses apparatus for extruding resinous material including a cylinder and a screw located therein for advancing the resinous material through the cylinder. A plurality of axially extending recesses are formed in the interior surface of the cylinder to assist forward movement of the resinous material therethrough.

These prior art references address various problems or aspects of screw extrusion processes. However, even with these prior art arrangements, selecting the proper screw design and changing the extruder screw are normally time consuming and expensive tasks.

SUMMARY OF THE INVENTION

An object of this invention is to operate a screw extruder in a manner that simulates changing the screw thereof.

Another object of the present invention is to vary the rates at which a plastic material is mixed, pressurized and heated as it is advanced through the barrel of a screw extruder, and to do this without changing the screw of the extruder.

A further object of this invention is to adjust the relative rates at which a plastic material is mixed, pressurized and heated in the barrel of a screw extruder, and to do this while the extruder is operating.

Another object of the present invention is to allow a section of the barrel of a screw extruder to rotate with, but at a speed less than that of, the screw of the extruder, and to use this rotating barrel section to control the relative rates at which a plastic material is heated, pressurized, and mixed in the extruder barrel.

These and other objectives are attained with a screw extruder comprising a longitudinally extending barrel including a feed section and a rotatable section. The feed section is provided to receive a plastic material; and the rotatable section is located forward of the feed section to receive the plastic material therefrom, and is supported for rotation about the longitudinal axis of the barrel. An extruder screw longitudinally extends and is supported for rotation in the barrel; and, in use, the extruder screw is rotated to rotate and advance the plastic material through the barrel.

This rotation of the extruder screw also causes the rotatable barrel section to rotate around the extruder screw, and preferably a brake is connected to the rotatable barrel section to slow rotational movement thereof. The rotational speed of the extruder screw relative to that of the rotatable barrel section controls the relative rates at which the plastic material is mixed, pressurized and heated as it advances through the extruder barrel; and by varying that relative rotational speed, those parameters can be adjusted without changing the extruder screw.

Further benefits and advantages of the invention will become apparent from a consideration of the following detailed description given with reference to the accompanying drawing, which specifies and shows a preferred embodiment of the invention.

BRIEF DESCRIPTION OF THE DRAWING

The sole FIGURE in the drawing is a side cross-sectional view of a screw extruder in accordance with this invention.

DETAILED DESCRIPTION OF THE PREFERRED EMBODIMENTS

The figure in the drawing shows screw extruder 10 generally comprising longitudinally extending barrel 12, bearing assembly 14, extruder screw 16, brake means 20, and hopper means 22. The extruder may also include die adaptor section 24. More specifically, barrel 12 includes feed section 26 and rotatable section 28; and preferably the barrel further includes forward section 30 forming transition portion 32, metering portion 34 and barrel outlet 36. Moreover, bearing assembly 14 includes bearing means 38 and bearing support means 40. Brake means 20 includes a source 42 of a braking force and means 44 to transmit that force to barrel section 28.

Barrel 12 defines the longitudinal axis of extruder 10, and is provided to conduct a plastic material from hopper means 22 to barrel outlet 36. More specifically, hopper means 22 is connected to feed section 26 of barrel 12, and is provided to hold a supply of a plastic material and to conduct that material into the feed section. This plastic material typically is a polymer in the form of solid pellets or chips. Rotatable section 28 of barrel 12 is located forward of feed section 26 to receive the plastic material therefrom, and forward section 30 is located forward of the rotatable section to receive the plastic material therefrom and to conduct that material to barrel outlet 36. Die adapter 24 is connected to the forward end of barrel 12, in communication with outlet 36, to facilitate connecting a forming die to the extruder barrel and to conduct plastic material from the barrel 12 to that forming die.

Bearing assembly 14 is connected to and supports barrel section 28 for rotation relative to feed section 26 and about the longitudinal axis of barrel 12, and any suitable bearing assembly may be employed to do this. With the preferred embodiment of bearing assembly 14, bearing means 38 directly engages and rotatably supports an outside surface of rotatable barrel section 28; and bearing support means 40 is connected to feed and forward sections 26 and 30 of barrel 12, and supports and holds the bearing means against the rotatable barrel section. Preferably, bearing means 38 includes first and second axially spaced bushings extending around and closely encircling the outside surface of the rotatable barrel section 28; and the bearing support means 40 includes a pair of support rods 46, and first and second support rings 50 and 52.

Support rods 46 are circumferentially spaced apart around rotatable barrel section 28, and are connected to and longitudinally extend between feed and forward sections 26 and 30. In particular, feed section 26 includes radially outwardly extending flange 54 located immediately rearward of rotatable section 28, forward barrel section 30 includes radially outwardly extending flange 56 located immediately forward of the rotatable barrel section, and support rods 42 are connected to and longitudinally extend between these two radial flanges.

Extruder screw 16, including a helically-shaped thread 60, longitudinally extends in barrel 12 and is supported therein in any suitable manner for rotation about the axis of the barrel to rotate and to advance the plastic material through the barrel. Screw 16 is attached to a drive shaft 62 that, in turn, is connected to and driven by a motor (not shown). A conventional gear box (also not shown) may be connected between drive shaft 62 and the motor so that the rotational speed of screw 16 will be substantially less than the rotational speed of the motor.

Preferably, the root diameter of screw 16 is constant from the back end of the screw to a position slightly forward of the forward end of rotatable section 28, and that diameter of the extruder screw gradually increases to a maximum value in transition portion 32 of barrel 12. Further, the root diameter of extruder screw 16 is preferably constant, at that maximum value, through metering portion 34 of barrel 12, to the forward end of the extruder screw. In this way, the molten or semi-molten plastic material in barrel 12 is continuously worked as it moves forward through the barrel; and by the time it reaches outlet 36, the plastic material is thoroughly mixed, is of a uniform composition, and has a viscosity sufficiently low so that it may be extruded through the barrel outlet.

In operation, die 64 is connected to die adapter section 24, plastic material is fed into hopper means 22, which feeds that material into barrel 12, and screw 16 is rotated to advance the plastic material through the barrel. As it moves forward, the plastic material changes from the solid state to the molten state, and the molten material is forced through outlet 36, through die adaptor 24 and through die 64 which forms the plastic into the desired shape.

During this operation of extruder 10, the rotating screw 16 not only advances the plastic material through barrel 12, but it also rotates the plastic material therein; and this rotating plastic material exerts a torque on rotatable barrel section 28 in the direction in which the extruder screw rotates, causing that rotatable barrel section to rotate along with the extruder screw. To insure an effective transfer of this torque to barrel section 28, preferably the length of that barrel section is at least one and a half times the distance between adjacent convolutions of thread 60; and even more preferably, the length of the rotatable barrel section 28 is at least about three times the distance between adjacent convolutions of the extruder screw thread 60.

Brake means 20 is connected to rotatable barrel section 28 to restrain rotational movement thereof and to control its rotational speed to something that is less than the screw speed. The rotational speed of screw 16 relative to that of rotatable barrel section 28 determines the relative rates at which plastic is mixed, pressurized and heated as it moves forward through barrel 12; and by adjusting the speed of barrel section 28, those parameters can be varied without changing screw 16.

Any suitable brake means may be used in the practice of this invention; and, for example, as previously mentioned, brake means 20 may comprise a source 42 of a braking force, and means 44 extending between that source of the braking force and rotatable barrel section 28 to transmit the braking force thereto. With the embodiment of this invention shown in the drawing, the means 44 to transmit the braking force includes first and second toothed sprockets 66 and 70, endless drive chain 72, connecting rod 74, and braking plate 76. Sprocket 66 is connected to the outside of rotatable barrel section 28 for rotational movement therewith, sprocket 70 is rotatably supported adjacent the rotatable barrel section, and chain 72 is mounted on and drivingly connects together those two sprockets. At the same time, rod or shaft 74 is connected to sprocket 70 for rotation therewith; and plate 76 is mounted on rod 74 for rotation therewith, and extends therefrom into source 42 of the braking force, which may be, for instance, an eddy current generator.

With this arrangement, rotational movement of barrel section 28 causes sprocket 66 to rotate, this rotates sprocket 70 via chain 72, and this in turn rotates plate 76 inside generator 42. The magnetic field inside generator 42 resists rotation of plate 76, thus resisting rotation of the sprockets 66 and 70 and barrel section 28. The force applied to plate 76 by generator 42 may be varied by changing the strength of the magnetic field inside the generator, and any suitable control means 80 may be utilized to do this. A hydraulic brake mechanism, where a fluid is used to resist rotational movement of plate 76, could be used in lieu of an electric generator. Also, a simple friction pad could be held against the outside surface of rotatable barrel section 28, and the pressure between that pad and the rotatable barrel section could be adjusted to vary the braking force applied to, and thus the rotational speed of, that section of barrel 12.

With reference again to bearing assembly 14, any suitable means may be used to connect rods 46 to flanges 54 and 56. For example, each of these rods 46 may comprise a sleeve mounted on an inside shaft that extends through longitudinally aligned openings in flanges 54 and 56; and these inside shafts, in turn, may be held in place between those flanges by means of heads on first ends of the shafts, forward of flange 56, and nuts mounted on second ends of the shafts, rearward of flange 54. Likewise, any suitable means may be employed to hold support rings 50 and 52 and bearings 38 in place within bearing assembly 14. For instance, rings 50 and 52 may be welded to rods 46, or connected thereto via set screws; and these support rings may include radially inwardly extending shoulders, both longitudinally forward and rearward of bearings 38, to limit longitudinal movement of the bearings along barrel section 28. In order to simplify the drawing, the above-mentioned set screws and inwardly extending shoulders of rings 50 and 52 are not shown in the drawing.

Preferably, barrel sections 26, 28 and 30 are axially aligned, have the same outside diameter, and the same inside diameter, and are located closely adjacent each other. In this way, feed and rotating sections 26 and 28 define a first annular interface, and rotating and forward sections 28 and 30 form a second annular interface. Suitable sealing means such as annular ring 82 is connected to and extends between feed and rotating sections 26 and 28 to seal the interface therebetween; and, similarly, sealing means such as annular ring 84 is connected to and extends between rotating and forward sections 28 and 30 to seal the interface therebetween. Also, as the plastic material advances through barrel section 28, that material exerts axially forward forces on the rotatable barrel section, and axial thrust bearing 86 may be located between barrel sections 28 and 30 to support the axial loads on the rotatable barrel section.

Preferably, barrel 12 is temperature controlled to help control the temperature of the plastic forced therethrough, and this temperature control may be achieved in any suitable way. For example, barrel 12 is commonly constructed of a metal having a high thermal conductivity, and a plurality of heating elements, for instance electric resistance heaters (not shown), may be mounted in a jacket wrapped around or attached to the outside of the barrel. These heating elements may be individually controlled in accordance with predetermined programs or predetermined set points. In addition, forming die 64 may also be temperature controlled so that the product that is extruded therefrom is at the proper temperature.

Also, at times, it may be desirable to cool extruder barrel 12, and suitable cooling means may be provided to do this. This cooling means may be, for example, a water-cooled jacket extending around barrel 12, or a fan to circulate air therearound. Normally, the cooling means are provided for the areas of barrel 12 adjacent the output end thereof.

While it is apparent that the invention disclosed herein is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

I claim:

1. A screw extruder comprising:
    a longitudinally extending barrel including
    (i) a feed section for receiving a plastic material, and
    (ii) an outlet to discharge the plastic material from the barrel; and
    an extruder screw rotatably supported in the barrel to rotate and to advance the plastic material therethrough;
    the barrel further including a rotatable section located forward of the feed section to receive the plastic material therefrom, and supported for rotation relative to the feed section and about the extruder screw, and wherein rotation of the extruder screw rotates the rotatable section around the extruder screw; and
    the screw extruder further comprising means connected to and supporting the rotatable section for said rotation 2. A screw extruder according to claim 1, further comprising brake means connected to the rotatable section to slow rotational movement thereof.

3. A screw extruder according to claim 2, wherein the brake means applies a braking force to the rotatable section, and the brake means includes control means to adjust the size of the braking force and change the rotational speed of the rotatable section.

4. A screw extruder according to claim 1, wherein the barrel further includes a forward section located forward of the rotatable section to receive the plastic material therefrom.

5. A screw extruder according to claim 4, wherein:
the rotatable section forms a first annular interface with the feed section, and a second annular interface with the forward section; and
the barrel further includes first seal means connected to and extending between the feed and rotatable sections to seal the first annular interface, and second seal means connected to and extending between the rotatable and forward sections to seal the second annular interface.

6. A screw extruder according to claim 4, wherein the means supporting the rotatable section includes a bearing assembly supported by and extending between the feed and forward sections.

7. A screw extruder according to claim 6, wherein the bearing assembly includes:
bearing means directly engaging and rotatably supporting an outside surface of the rotatable section; and
means connected to the feed and forward sections, and supporting and holding the bearing means against the rotatable section.

8. A screw extruder according to claim 7, wherein the bearing means includes first and second axially spaced bushings closely encircling the outside surface of the rotatable section.

9. A screw extruder according to claim 8, wherein the means supporting and holding the bearing means includes:
a plurality of circumferentially spaced support rods connected to and longitudinally extending between the feed and forward sections;
a first ring mounted on the support rods, extending radially inward therefrom, and having a first inside circumferential surface, the first bushing being supported on the first circumferential surface and being radially captured between the first circumferential surface and the outside surface of the rotatable section; and
a second ring mounted on the support rods, extending radially inward therefrom, and having a second inside circumferential surface, the second bushing being supported on the second circumferential surface and being radially captured between the second circumferential surface and the outside surface of the rotatable section.

10. A screw extruder according to claim 9, wherein:
the forward section includes a radially outwardly extending flange;
the feed section includes a radially outwardly extending flange; and
the support rods are connected to and longitudinally extend between the flanges of the feed and forward sections.

11. A screw extruder according to claim 2, wherein the brake means includes:
a source of a braking force; and
means extending between the source of the braking force and the rotatable section of the barrel to transmit the braking force to said rotatable section.

12. A screw extruder according to claim 11, wherein the means to transmit the braking force includes:
a first sprocket located radially outside of and connected to the rotatable section for rotation therewith;
a second sprocket rotatably supported adjacent the first sprocket;
an endless chain mounted on and connecting together the first and second sprockets to rotate the second sprocket with the first sprocket; and
means connecting the second sprocket to the source of the braking force to transmit the braking force to the first and second sprockets and the rotatable section of the barrel.

13. A screw extruder according to claim 11, wherein the brake mean further includes control means to vary the magnitude of the braking force to vary the rotational speed of the rotatable section of the barrel.

14. A screw extruder according to claim 1, wherein:
the extruder screw includes a thread having a plurality of convolutions axially spaced apart a preset distance; and
the length of the rotatable section is at least one and a half times said preset distance.

15. A screw extruder comprising:
a longitudinally extending barrel including
(i) a feed section for receiving a plastic material,
(ii) a rotatable section located forward of the feed section to receive the plastic material therefrom, and from the barrel;
a bearing assembly connected to and supporting the rotatable section of the barrel for rotation relative to the feed section and about the longitudinal axis of the barrel;
an extruder screw longitudinally extending and supported for rotation in the barrel to rotate and to advance the plastic material therethrough, and to cause the rotatable section to rotate; and
brake means connected to the rotatable section to slow rotational movement thereof and to maintain the rotational speed of the rotatable section less than the rotational speed of the extruder screw.

16. A screw extruder according to claim 15, wherein the brake means includes:
a source of a braking force;
means extending between the source of the braking force and the rotatable section of the barrel to transmit the braking force thereto; and
control means to adjust the size of the braking force and change the rotatable speed of the rotational section.

17. A screw extruder according to claim 16, wherein:
the barrel further includes a forward section located forward of the rotatable section to receive the plastic material therefrom; and
the bearing assembly includes
(i) bearing means directly engaging and rotatable supporting an outside surface of the rotatable section, and
(ii) means connected to the feed and forward sections, and supporting and holding the bearing means against the rotatable section.

* * * * *